Sept. 13, 1932.  E. B. LE MARE  1,877,674
GLASS ANNEALING LEER
Filed Dec. 18, 1930
Fig. 1.
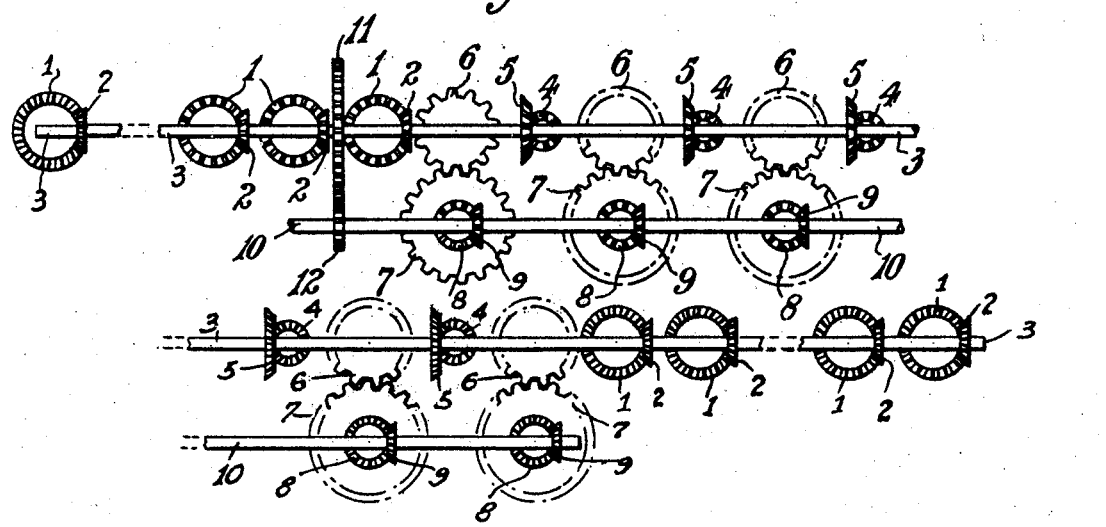
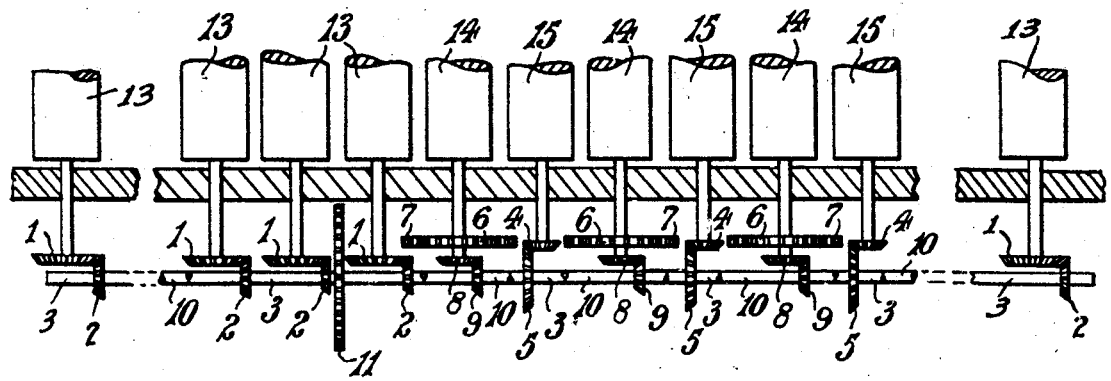
Fig. 2.
Inventor.
E. B. Le Mare
By Morrison, Kennedy Campbell
Attys.

Patented Sept. 13, 1932

1,877,674

UNITED STATES PATENT OFFICE

ERNEST BRISTOW LE MARE, OF ST. HELENS, ENGLAND, ASSIGNOR TO PILKINGTON BROTHERS LIMITED, OF LIVERPOOL, ENGLAND, A COMPANY OF ENGLAND

GLASS ANNEALING LEER

Application filed December 18, 1930, Serial No. 503,199, and in Great Britain December 28, 1929.

This invention relates to glass annealing leers and particularly to leers through which glass is propelled by rotating rollers which constitute the bed of the leer.

It has been found that these rollers are liable to distortion, and as a result of their not running true, they tend to deform the plane surface of the glass transversely of the direction of its movement through the leer. Any such deformation created near the entrance of the leer is not of material importance as the glass is then sufficiently plastic for the deformation to be flattened out before the glass reaches the solidification zone in the leer.

When, however, the deformation is formed in the region of the solidification zone, it may be permanent, and if of large amplitude, may give rise to difficulties in the subsequent treatment of the glass.

The object of the present invention is to ensure that the risk of deformation of the glass surface in the region of the solidification zone shall be minimized, and that any deformation which occurs shall be too small to be objectionable.

According to the invention rollers in the solidification zone are turned rapidly, some in a forward and others in a reverse direction, the resultant speed of the rollers being a forward speed equal to that of the rollers outside the said zone.

In the accompanying drawing:—

Figure 1 shows diagrammatically in elevation a portion of the gearing for driving leer rollers according to this invention, with intermediate portions broken away, the lower section of the figure constituting a rightward extension of the upper section and Figure 2 is a diagrammatic plan of the same, partly broken away, showing portions of the respective leer rollers.

Bevel gear wheels 1, mounted on the end of leer rollers 13, are driven by bevel gear wheels 2 on the shaft 3.

In the solidification zone, which is the portion from A to B in Figure 1, the alternate rollers 15 have bevel gear wheels 4, driven by bevel gear wheels 5, mounted on the shaft 3, so as to turn the rollers 15 with wheels 4 in the opposite direction to, and at four times the speed of the rollers 13 with wheels 1.

The other alternate rollers 14 have spur gear wheels 6 engaging gear wheels 7 on separate stub shafts which carry bevel gear wheels 8 engaging bevel gear wheels 9 on a shaft 10 driven from the shaft 3 by the spur gear wheels 11 and 12. The ratio of the gear wheels 11, 12, is such that the rollers 14 with gear wheels 6 are turned in the same direction as are the rollers 13 with gear wheels 1, but at five times the speed.

By these rollers the resultant forward speed of each pair of rollers 15, 14, with gear wheels 4 and 6, is the speed of the rollers 13 with gear wheels 1, while each of the rollers 15, 14, is turning faster.

The rapid rotation of these rollers not only lessens the effect on the glass of their distortion but also has the great advantage that the rollers which are turned rapidly suffer less from distortion than those turned slowly.

The above-mentioned speeds are given by way of example only and any speeds, faster than the normal speed of the rollers with gear wheels 1, may be employed. Further, it is not necessary, though it is preferable, that the reverse-turning rollers should alternate with the forward turning rollers, provided that there are in the solidification zone groups of rollers turning rapidly in the reverse direction and groups of rollers turning still more rapidly in the forward direction, the resultant forward speed of all the said rollers being equal to the normal forward speed of the rollers in the leer outside the solidification zone.

Having described my invention, I declare that what I claim and desired to secure by Letters Patent is:—

Roller bed for a glass annealing leer comprising a first group of rollers turning at a speed corresponding to the speed of the glass, a second group of rollers turning at a speed more than three times the speed of the first group, a third group of rollers, interspersed with the rollers of the second group, turning backwardly at a speed more than twice the speed of the first group and a final group of rollers turning at the speed of the first group.

In witness whereof I have affixed my signature hereto.

ERNEST BRISTOW LE MARE.